United States Patent [19]
Cogan

[11] Patent Number: 5,768,004
[45] Date of Patent: Jun. 16, 1998

[54] OXIDATIVELY COLORING ELECTROCHROMIC MATERIAL AND ELECTRO-OPTICAL DEVICE USING SAME

[75] Inventor: Stuart F. Cogan, Sudbury, Mass.

[73] Assignee: EIC Laboratories, Inc., Norwood, Mass.

[21] Appl. No.: 678,724

[22] Filed: Jul. 11, 1996

[51] Int. Cl.$^6$ .............................................. G02F 1/155
[52] U.S. Cl. ............................................................ 359/269
[58] Field of Search ............................................. 359/269

[56] References Cited

U.S. PATENT DOCUMENTS

| | | | |
|---|---|---|---|
| 3,971,624 | 7/1976 | Bruesch et al. | 359/267 |
| 4,938,571 | 7/1990 | Cogan et al. | 359/269 |
| 5,274,493 | 12/1993 | Couput et al. | 359/265 |

FOREIGN PATENT DOCUMENTS

| | | | |
|---|---|---|---|
| 58-105126 | 6/1983 | Japan | 359/269 |

OTHER PUBLICATIONS

Cogan et al., "Optical properties of electrochromic vanadium pentoxide," J. Appl. Phys., 66, 1333–1337 (1989). 1 Aug. 1989.

Cogan et al., "Electrochromism in Nb–V and Cr–V Mixed Oxides," J. Electro–chem. Soc., 140, 112–115 (1993). Jan. 1993.

Baudrey et al., "Electrochromic Window with Lithium Conductive Polymer Electrolyte," J. Electrochem. Soc., 138, 460–465 (1991). Feb. 1991.

Andersson et al., "Towards an All–Solid–State Smart Window: Electrochromic Coatings and Polymer Ion Conductors," Proc. SPIE vol. 1016, 41–49 (1988). (no month).

Primary Examiner—Richard A. Rosenberger

[57] ABSTRACT

An electro-optical device having an oxidatively coloring electrochromic layer of composition $Mn_xV_yO_z$, where $0.05 \le x/y<1$, $x+2y<z<2x+(5/2)y$, and $x+y=1$, with improved transmittance modulation, the $Mn_xV_yO_z$ providing complementary optical modulation to reductively coloring electrochromic materials in devices employing an all-thin-film configuration with a solid ion conducting electrolyte and in devices employing a laminated configuration with a polymeric ion conducting electrolyte.

13 Claims, 11 Drawing Sheets

OXIDATIVELY COLORING ELECTROCHROMIC MATERIAL AND ELECTRO-OPTICAL DEVICE USING SAME

This invention was made with Government support under Grant DMI-9561597 awarded by the National Science Foundation. The Government has certain rights to this invention.

FIELD OF THE INVENTION

This invention relates to electro-optical devices employing electrochromic materials. The electro-optical devices are useful for modulation of light transmission, reflection, and absorption.

BACKGROUND OF THE INVENTION

An electrochromic material changes its optical properties in response to an electrically driven change in its state of oxidation or reduction. A voltage applied to an electro-optical device from an external power supply causes electrons to flow to (reduction) or from (oxidation) the electrochromic material. In order to maintain charge neutrality, a charge balancing flow of ions occurs in the electrochromic device. To mediate between electron flow in the external circuit and ion flow in the electrochromic device, provision for reversible oxidation and reduction reactions during optical switching must be provided. Most prior art electrochromic devices contain an electrochromic material such as a-$WO_3$ (a=amorphous) which becomes colored on reduction. The accompanying oxidation reaction is usually provided for by the use of a counter electrode.

A major consideration in electrochromic devices is the material of the counter electrode. For variable transmittance electrochomic devices, the oxidation and reduction of the counter electrode must not interfere with the transmission modulation of the device. Counter electrodes in variable transmittance devices can utilize materials that are substantially transparent and which undergo very little optical modulation on reduction and oxidation. Examples of such materials are $Nb_2O_5$ and $TiO_2$ (S. Cogan et al., Proc. Soc. Photo-Optic. Instrum. Eng., vol 562, (1985), pp. 23–31) or a "macroporous" layer of crystalline $WO_3$ (U.S. Pat. No. 4,278,329, K. Matsuhiro and Y. Masuda, July 1981). The counter electrode may also be a reduction-oxidation couple dissolved in a liquid or semisolid electrolyte (U.S. Pat. No. 4,550,982, Y. Hirai, November 1985). The most useful counter electrode, however, is itself an electrochromic material which colors and bleaches in tandem with the principal electrochromic material. An example of such a material is $V_2O_5$. Prior art electrochromic devices employing $V_2O_5$ as a $Li^+$ ion counter electrode to a-$WO_3$ have been described by Baudry et al., (J. Electrochem Soc., vol 138 (1991) pp. 460–465) and Andersson et al., (Proc. Soc. Photo-Optic. Instrum. Eng., vol 1016, (1988) pp. 41–49). The transmittance switching range of a-$WO_3$/$V_2O_5$ devices is limited by weak cathodic coloration in $V_2O_5$. Details of the electrochromic properties of $V_2O_5$ and the limitations these impose on electrochromic device performance have been described by Cogan et al. (J. Appl. Phys., vol 66, (1989) pp. 1333–1337). Mixed oxide films of vanadium and chromium or mixed oxides of vanadium or chromium with Nb, Ta, and Ti having weak anodic coloration have been taught by Cogan and Rauh (U.S. Pat. No. 4,938,571, July 1990). Although in their preferred embodiments the aforementioned mixed-oxide films exhibit anodic coloration, their usefulness is limited by low coloration efficiencies and slow kinetics for the reduction-oxidation reaction with the $Li^+$ ion. In another example of prior art, Cogan and Rauh (U.S. Pat. No. 5,080,471, January 1992) teach an oxidatively coloring electrochromic film of composition $M_yCrO_{2+x}$ (0.33<y<2.0 and x<2) where M=Li, Na, or K. The $M_yCrO_{2+x}$ films exhibit useful optical properties and are incorporated in solid-state electrochromic devices that have a transmittance range of 7% to 79% in the visible spectrum. The $M_yCrO_{2+x}$ films have the disadvantage of requiring an in vacuo synthesis step during electrochromic device coating which complicates the fabrication process.

In the case of electrochromic devices employing $H^+$ as the charge balancing counter ion, a combination of reductively coloring a-$WO_3$ and oxidatively coloring $IrO_2$ has been taught. Both the a-$WO_3$ and $IrO_2$ contribute to the optical modulation, improving the efficiency of the optical change and increasing the maximum transmittance range over which the device may switch. Examples of such devices in the prior art include Takahashi et al., U.S. Pat. No. 4,350,414, September 1982 and Cogan et al., Proc. Soc. Photo-Optic. Instru. Eng., vol 823, pp 106–112 (1987). Electrochromic devices using $H^+$ as the counter ion require some lattice water to achieve the desired level of ionic conductivity for optical switching. Lattice water is a major contributor to degradation in electrochromic devices exposed to service environments.

If an electrochromic device is to have reproducible optical switching behavior and exhibit a high switching cycle lifetime, then the electrochemical oxidation and reduction reactions at both the electrochromic electrode and counter electrode must be reversible and free of parasitic side reactions. These considerations are of paramount importance in applications where high switching cycle lifetimes and long service life are required. Furthermore, if the electrochemical reactions at both electrodes are well-defined and reversible, an electrochromic device may be constructed with optical properties uniquely determined by the switching voltage. A unique relationship between optical state and applied switching voltage is advantageous because it eliminates the need for external sensors to monitor the optical switching.

SUMMARY OF THE INVENTION

The present invention provides an electro-optical device containing an electrochromic material that colors by oxidation. The oxidatively coloring electrochromic material is particularly useful in electro-optical devices containing a second electrochromic material that colors by reduction. In the latter devices, the prior art distinction between the electrochromic electrode and counter electrode is removed. Both electrodes are electrochromic and contribute to the overall optical modulation of the device and both electrodes provide reversible oxidation and reduction reactions that are mutually charge balancing.

The oxidatively coloring electrochromic material of the present invention is $Mn_xV_yO_z$ where $0.05 \leq x/y < 1$, $x+2y<z<2x+(5/2)y$, and $x+y=1$.

DESCRIPTION OF THE PREFERRED EMBODIMENTS

Figure 1:
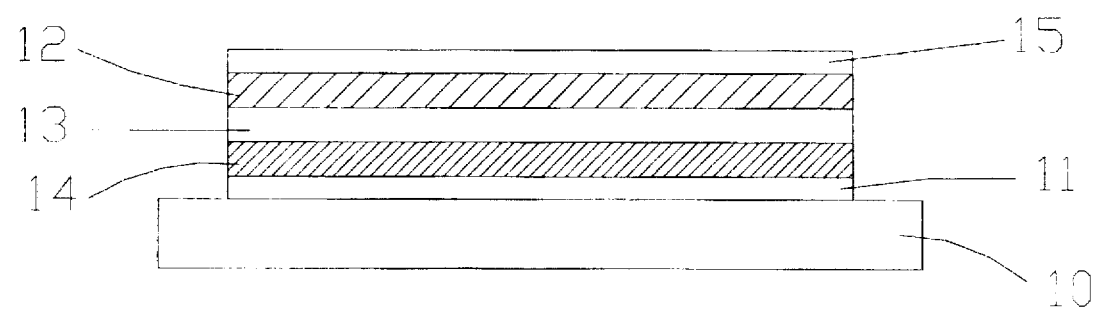
FIG. 1 is a cross-sectional view of an electro-optical device of the present invention embodying a solid ion conducting layer.

Referring to FIG. 1, a cross-sectional view of an electro-optical device of the present invention in a preferred embodiment is shown. The device comprises five layers disposed sequentially over a substrate (10). Layers 11 and 15 are thin-film, transparent electronic contacts which supply current to the electrochromic layers. Preferred materials for the transparent electrical contacts (11, 15) include tin-doped indium oxide (ITO), aluminum-doped zinc oxide, and fluorine-doped tin oxide (SFO). In electro-optical devices designed to modulate reflectance, one of the electrical contacts (11, 15) is reflective in the spectral range over which reflectance modulation is desired. Preferred materials for a reflective electrical contact include Al, Cr, Ag, Ni, and Au. Layer 12 is the oxidatively coloring $Mn_xV_yO_z$ electrochromic material of the present invention. Layer 14 is an electrochromic material that is reversibly oxidizable and reducible and colors by reduction. Preferred materials for layer 14 include amorphous and crystalline $WO_3$, amorphous and crystalline $MoO_3$, crystalline $K_xWO_{3-x/2}$ potassium hexatungstate) and mixtures thereof. Separating layers 12 and 14, is an ion conducting layer (13) that has a high electronic resistivity. For Li$^+$ counter ion electrochromic devices, preferred materials for the Li$^+$ conducting layer include $Li_2O$—$B_2O_3$ mixtures, ternary mixtures of $Li_2O$—$B_2O_3$ and alkali halides such as LiCl and LiBr (U.S. Pat. No. 4,184,015, June 1980), $LiAlF_4$, and ternary mixtures of $Li_2O$—$SiO_2$—$ZrO_2$ (U.S. Pat. No. 4,474,686, October 1984). Not shown in FIG. 1 is a quantity of lithium added to one or both the electrochromic layers 12 and 14. This lithium is electrochemically active and may be shuttled between layers 12 and 14 in response to an externally applied voltage at the electrical contact layers (11 and 15). For electrochromic devices operating with H$^+$ as the counter ion, preferred materials for the ion conducting layer (13) include hydrated $Ta_2O_5$, $ZrO_2$, and $SiO_2$. For H$^+$ counter ion devices some of the $H_2O$ of hydration may be electrolyzed to provide H$^+$ ions for charge balance or one or both electrochromic films may be fabricated in a reduced state. In the reduced state, the electrochromic films contain H$^+$ ions that may be shuttled between the electrochromic layers by the application of an external switching voltage to the transparent contacts. The substrate layer (10) for Li$^+$ and H$^+$ counter ion devices is typically glass, but may also be plastic or other material suitable for coating with an electrochromic device.

The electrochromic device is typically fabricated by sequential sputtering or evaporation of each layer, but other processes such as chemical vapor deposition (CVD), plasma enhanced CVD or sol-gel coating may also be employed. In a preferred embodiment of the present invention, the oxidatively coloring $Mn_xV_yO_z$ is formed by reactive direct-current (DC) magnetron sputtering from a metal target. A single metal target of a MnV alloy or individual Mn and V targets may be employed. In the reactive sputtering process an oxygen containing plasma is provided to convert the sputtered metal to the oxide.

Figure 2:
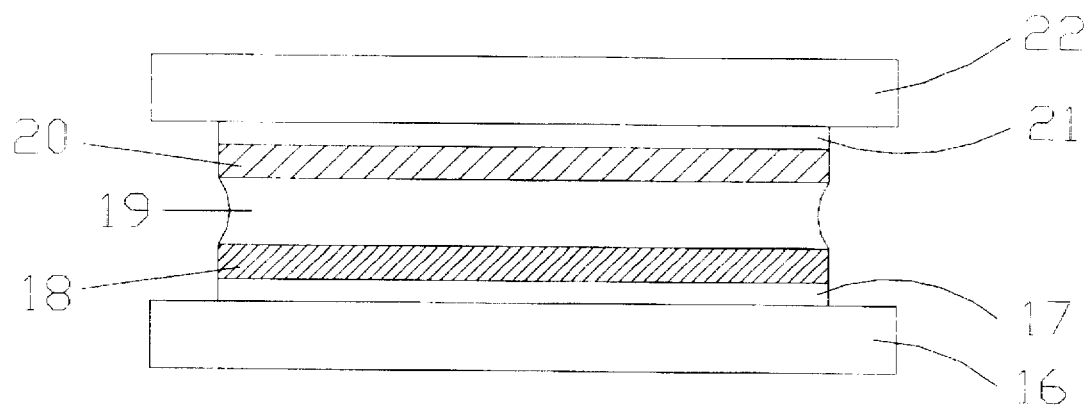
FIG. 2 is a cross-sectional view of an electro-optical device of the present invention embodying a polymeric ion conductor.

In another embodiment of the present invention, revealed in FIG. 2, an ion conducting polymer (19) replaces the solid ion conductor (13) of the first embodiment. The ion conducting polymer is disposed between two substrates (layers 16 and 22) coated with electronically conducting layers 17 and 21. On one substrate is a layer (18) of a reductively coloring electrochromic material (e.g. $WO_3$) and on the other substrate is a layer of $Mn_xV_yO_z$ (20). One or both the reductively coloring electrochromic layer and the $Mn_xV_yO_z$ are partially reduced to provide ions for charge balance during switching. For Li$^+$ ion devices, suitable polymeric conductors include polyethylene oxide and mixtures of polyvinylpyrrolidone with polyethylene glycol, N-methyl pyrrolidone or γ-butyrolactone. These polymers contain Li salts such as $LiClO_4$, $LiCF_3SO_3$, or $LiBF_4$ to impart the desired ionic conductivity. For H$^+$ ion devices, preferred polymeric conductors are those derived from vinyl sulfonic acids, such as acrylamido propane sulfonic acid (AMPS) and styrene sulfonic acid. The use of AMPS in UV-polymerizable polymers for H$^+$ devices has been taught by Cogan and Rauh in U.S. Pat. No. 5,327,281, July 1994.

The anodically coloring $Mn_xV_yO_z$ of the present invention has the property that it becomes increasingly transparent on reduction over a broad wavelength range that encompasses at least the 350 nm to 800 nm spectral band. $Mn_xV_yO_z$ also undergoes reversible oxidation and reduction in accordance with the following reaction

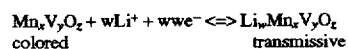

where w represents the mole fraction of lithium inserted into the reduced $Li_wMn_xV_yO_z$. Using $WO_3$ as an example of a preferred reductively coloring electrochromic material, the overall electrochromic reaction in an electro-optical device in a preferred embodiment of the present invention is

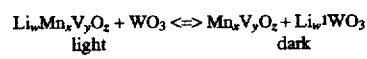

where w' is the mole fraction of lithium in the reduced $Li_{w'}WO_3$.

Figure 3:
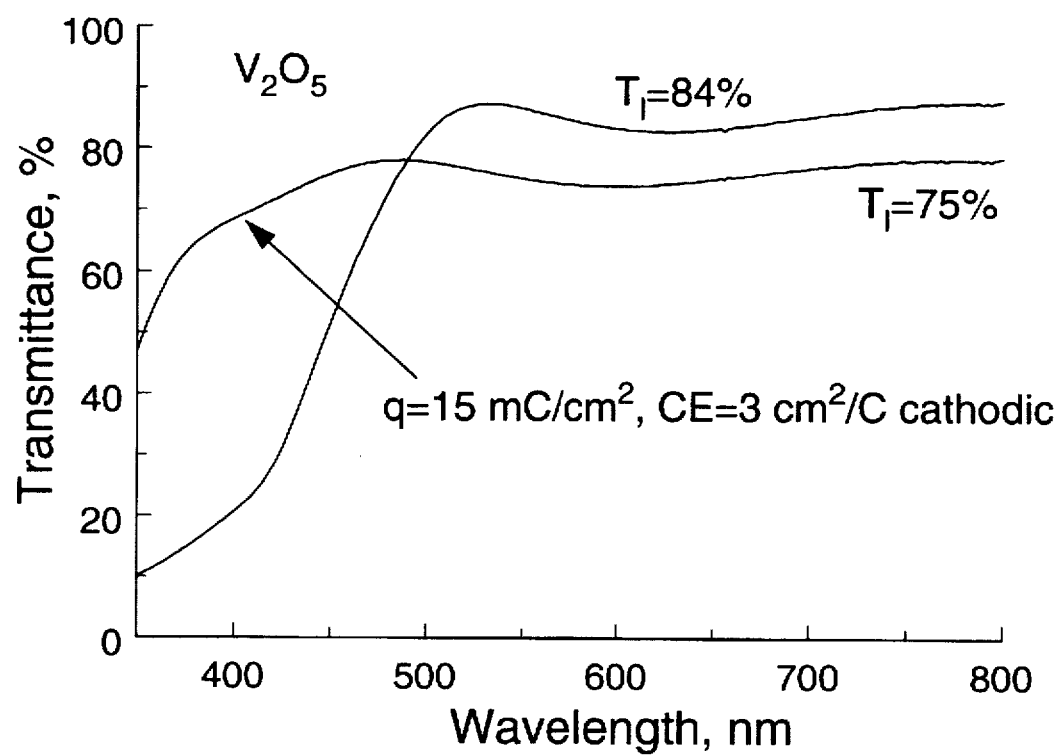
FIG. 3 shows the spectral transmittance modulation of a prior art electrochromic film of $V_2O_5$ in response to insertion of 15 mC/cm$^2$ of lithium.
Figure 4:
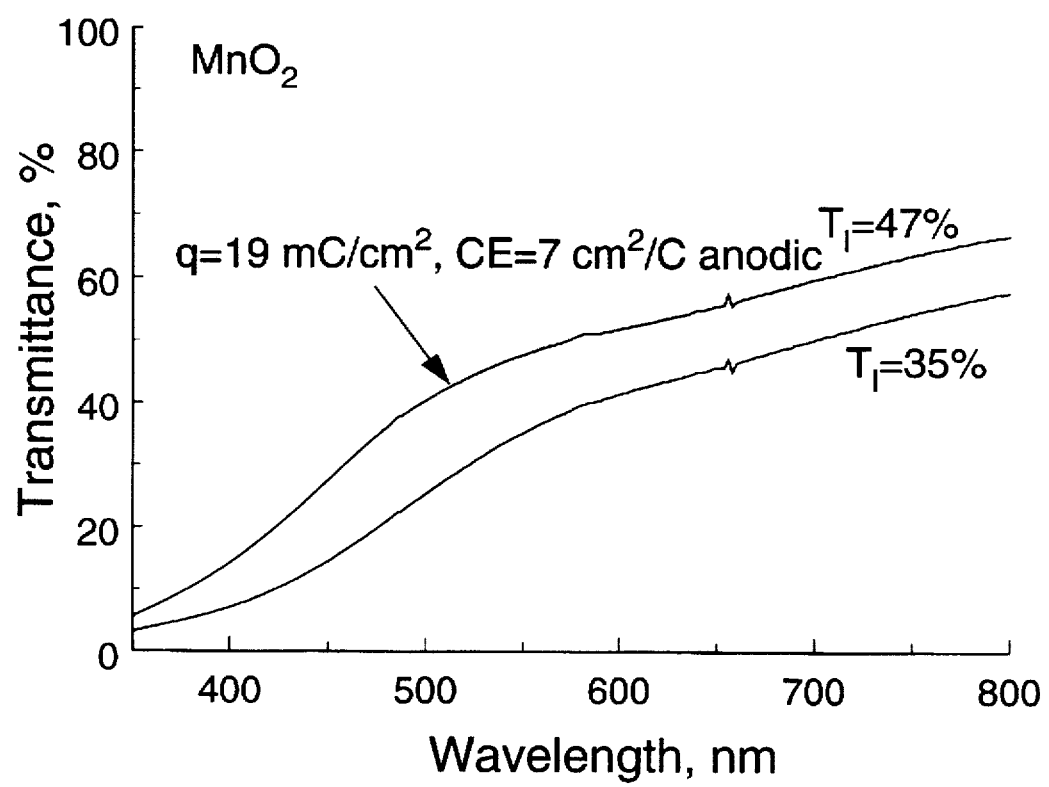
FIG. 4 shows the spectral transmittance modulation of a prior art electrochromic film of $MnO_2$ in response to insertion of 19 mC/cm$^2$ of lithium.

The advantage of the $Mn_xV_yO_z$ of the present invention over prior art materials is demonstrated by comparison of its electro-optical properties with $V_2O_5$ and $MnO_2$. Thin films of $V_2O_5$ have been described in the prior art for use in devices that employ reductively coloring electrochromic materials such as $WO_3$. Cogan et al (J. Appl. Phys. vol 66, pp 1333–1337, 1989) describe an electrochromic device based on $WO_3$ and $V_2O_5$. The optical switching performance of the device is limited by undesirable reductive coloring in the $V_2O_5$ at wavelengths longer than 500 nm. This weak reductive coloring reduces the overall transmittance range of electrochromic devices employing $V_2O_5$. For the purpose of illustration, the optical response of a 60 nm thick $V_2O_5$ film on lithium insertion is shown in FIG. 3. On insertion and extraction of 15 mC/cm$^2$ of lithium (1 mC is equivalent to $6.2\times10^{15}$ Li$^+$ ions), the Li$_x$V$_2$O$_5$ shows the desired effect of oxidative coloring at wavelengths shorter than 500 nm. At longer wavelengths, the Li$_x$V$_2$O$_5$ is reductively coloring. The luminous transmittance, the transmittance weighted to the photopic response of the human eye, of the $V_2O_5$ decreased from 84% to 75% on insertion of 15 mC/cm$^2$ of lithium, demonstrating the weak reductive coloration. The optical response of $V_2O_5$ has been explained by Cogan et al (J. Appl. Phys., vol 66, (1989) pp. 1333–1337) as a shift in the optical absorption edge concurrent with the development of an absorption band in the red and near-infrared during lithium insertion. Referring to FIG. 4, the electro-optical response of $MnO_2$ is shown for insertion of 19 mC/cm$^2$ of lithium. The $MnO_2$ exhibits the desired anodic coloration over the entire visible spectrum (380–720 nm). However, the Li$_x$MnO$_2$ films are too dark, even in their fully reduced state (the state of maximum reversible lithium insertion), for use in practical devices. The maximum luminous transmittance of a typical 60 nm thick Li$_x$MnO$_2$ is 47%. Thus, it is shown that both $V_2O_5$ and $MnO_2$ films have deficiencies in their electro-optical properties that limit their usefulness in electrochromic devices.

Figure 5:
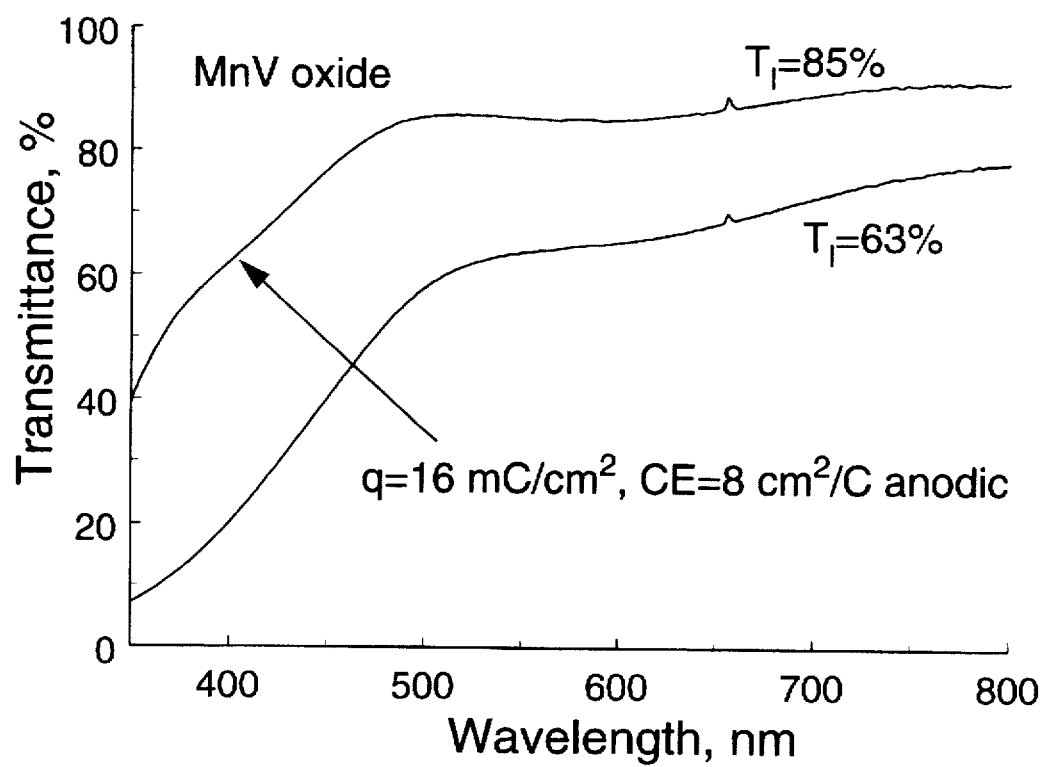
FIG. 5 shows the spectral transmittance modulation of a $Mn_xV_yO_z$ electrochromic film of the present invention in response to insertion of 16 mC/cm$^2$ of lithium.

Referring to FIG. 5, the electro-optical response of a Mn$_x$V$_y$O$_z$ film of the present invention is shown. On insertion of 16 mC/cm$^2$ of lithium, the Mn$_x$V$_y$O$_z$ becomes increasingly transparent over the entire visible spectrum and, furthermore, exhibits a desirably high maximum luminous transmittance of 85%. The Mn$_x$V$_y$O$_z$ is thus seen to overcome the weak reductive coloration of $V_2O_5$ and the low maximum transmittance of $MnO_2$.

The preferred composition range for the oxidatively coloring electrochromic material of the present invention is Mn$_x$V$_y$O$_z$ where $0.05 \leq x/y < 1$, $x+2y < z < 2x+(5/2)y$ and $x+y=1$. This composition range was established by experimentation that showed a ratio of about 0.05 Mn/V was necessary to achieve an improved electro-optical response in the Mn$_x$V$_y$O$_z$ compared with that obtained in $V_2O_5$. Because oxide-based electrochromic coatings are often substoichiometric in oxygen while retaining the structure and electrochromic properties of the fully oxidized material, the oxygen concentration (z) may vary from $x+2y<z<2x+(5/2)y$. The lower bound of $x+2y$ is determined from the probable minimum oxidation states of the Mn and V, which are 2$^+$ and 4$^+$, respectively. Similarly, the $2x+(5/2)y$ upper bound is established from the expected maximum oxidation states which are 4$^+$ and 5$^+$ for Mn and V, respectively.

EXAMPLE 1 OF PRIOR ART

A variable transmittance electro-optical device was fabricated using amorphous $WO_3$ as a reductively coloring electrochromic layer and a prior art film of $V_2O_5$ as a counter electrode layer. The device was fabricated with a polymer-laminate construction shown in cross-section in FIG. 2. Glass substrates, coated with a visibly transparent film of ITO having a sheet resistance of 15 Ω/sq., were obtained from a commercial vendor. A 500 nm thick film of amorphous $WO_3$ was deposited over the ITO on one substrate by e-beam evaporation in a vacuum coating chamber. The evaporation was performed at a substrate temperature of 175° C. in an oxygen pressure of $2\times10^{-4}$ torr and at a deposition rate of 0.1 nm/s. The evaporant source material was stoichiometric $WO_3$. The e-beam evaporation process is well known to artisans of vacuum coating technology and only those process conditions specific to the deposition of electrochromic $WO_3$ are described. A 60 nm thick film of $V_2O_5$ was deposited on a second ITO-coated glass substrate by reactive DC magnetron sputtering in a vacuum coating chamber. The sputtering was performed at a pressure of 10 millitorr in a reactive gas mixture of 20% oxygen and 80% argon using a DC power of 200 watts. The sputter target was pure V metal with an area of 20 cm$^2$. The substrate temperature during deposition was held at 225° C. Details of the sputtering process and the structure, morphology, and electrochromic properties of the $V_2O_5$ films are found in the scientific literature (e.g. Cogan et al, J. Appl. Phys. vol 66, pp 1333–1337, (1989); and Cogan et al, Proc. Soc. Photo-Optic. Instrum. Eng., vol 1016, pp 57–62 (1989)).

The amorphous $WO_3$ layer was reduced by insertion of 20mC/cm$^2$ of lithium. The lithium insertion was performed in vacuo by e-beam evaporation of lithium into the $WO_3$ film. The lithium was evaporated at a pressure of $<2\times10^{-6}$ torr at ambient substrate temperature. The electro-optical device was then fabricated by laminating the reduced $WO_3$ and $V_2O_5$ layers with a Li$^+$ ion conducting polymer and the edges sealed with an epoxy adhesive. Provision was made for electrical contact to the ITO coating on each substrate by masking a small portion of the ITO layer during vacuum coating.

Figure 6:
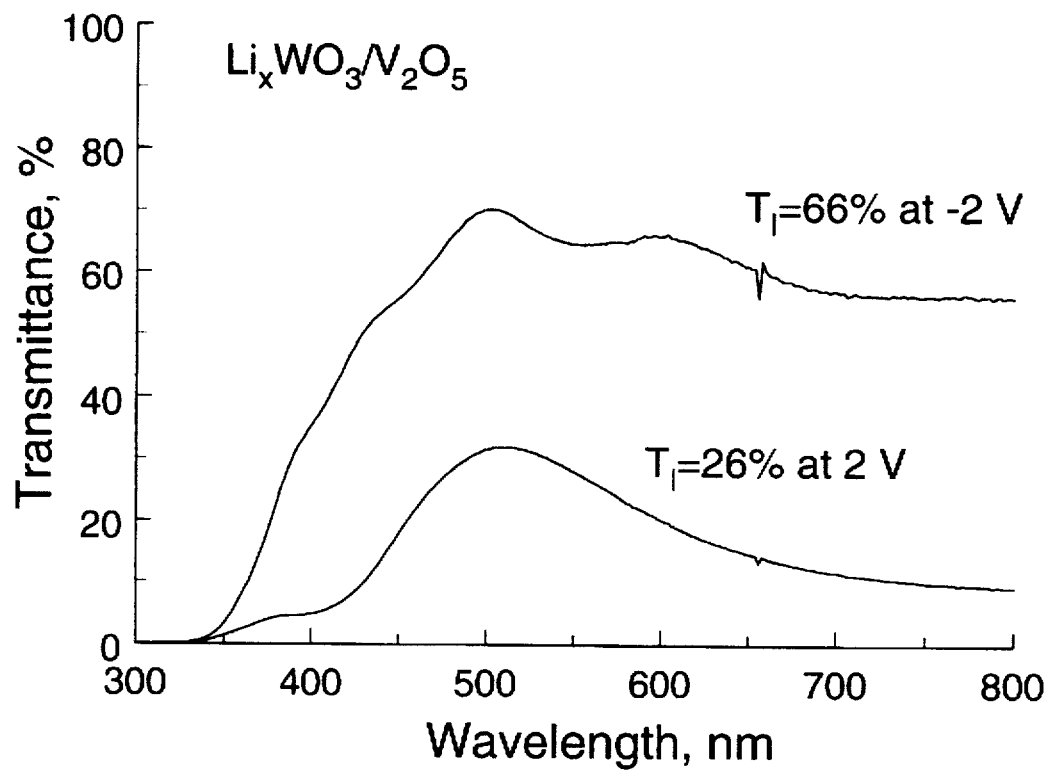
FIG. 6 shows the spectral transmittance modulation of a prior art electro-optical device employing $V_2O_5$ and reductively coloring $WO_3$.

The spectral transmittance range of the $WO_3$/$V_2O_5$ electro-optical device is shown in FIG. 6. At a switching voltage of ±2 V applied to the ITO electrodes, the luminous transmittance range ($T_L$ in FIG. 6) of the device was 26% to 66%.

EXAMPLE 2

A variable transmittance electro-optical device was fabricated using amorphous $WO_3$ as a reductively coloring electrochromic layer and a Mn$_x$V$_y$O$_z$ layer of the present invention as an oxidatively coloring counter electrode. The deposition and reduction of the amorphous $WO_3$ layer was identical to that described in Example 1.

The Mn$_x$V$_y$O$_z$ layer was deposited on ITO-coated glass by reactive DC magnetron co-sputtering from pure metal targets of Mn and V. The sputtering was performed at a pressure of 10 millitorr using a reactive gas mixture of 50% oxygen and 50% argon at ambient substrate temperature. The Mn/V ratio (x/y) in the layer was controlled by the power to the Mn and V sputter guns. For the Mn$_x$V$_y$O$_z$ layer used in the present device, 33 watts of power was applied to the Mn sputter gun and 100 watts to the V sputter gun. The thickness of the Mn$_x$V$_y$O$_z$ layer was 60 nm. The electro-optical device was fabricated by lamination with a Li$^+$ ion conducting polymer as described in Example 1.

Figure 7:
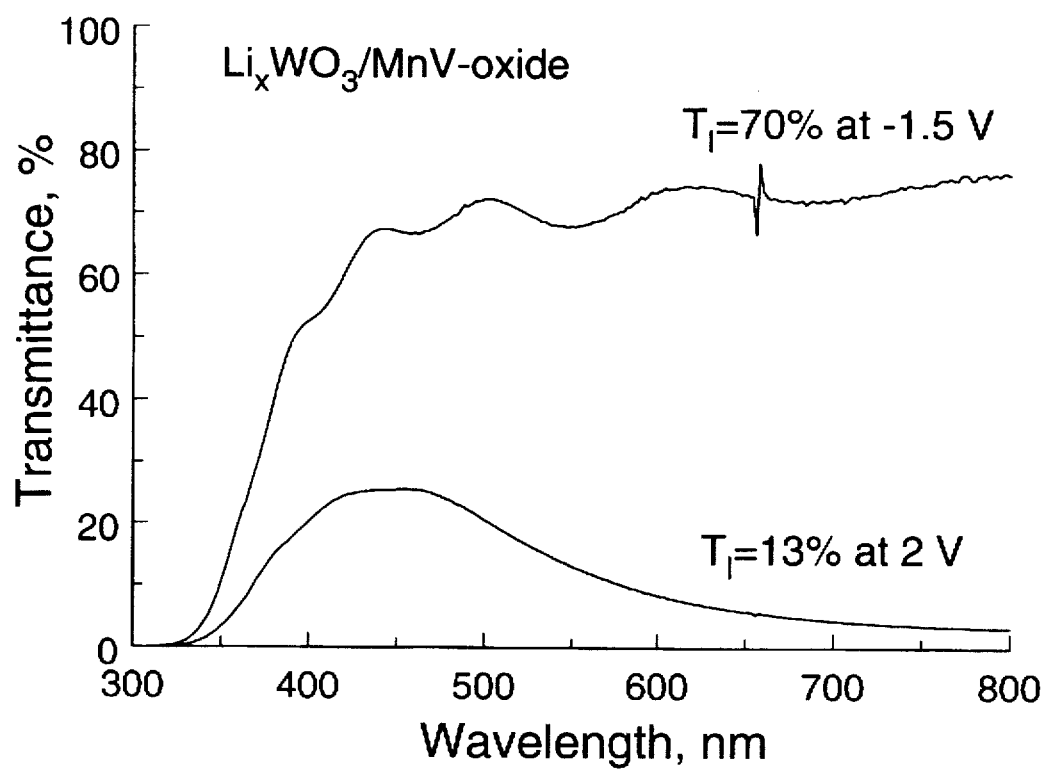
FIG. 7 shows the spectral transmittance modulation of an electro-optical device of the present invention employing $Mn_xV_yO_z$ and reductively coloring $WO_3$.

The spectral transmittance range of the $WO_3$/Mn$_x$V$_y$O$_z$ electro-optical device is shown in FIG. 7. At a switching voltage of 2 V and −1.5 V with respect to the Mn$_x$V$_y$O$_z$ layer the luminous transmittance range of the device was 13% to 70%. This transmittance range is a significant improvement over that obtained with the prior art device in Example 1.

EXAMPLE 3

Figure 8:
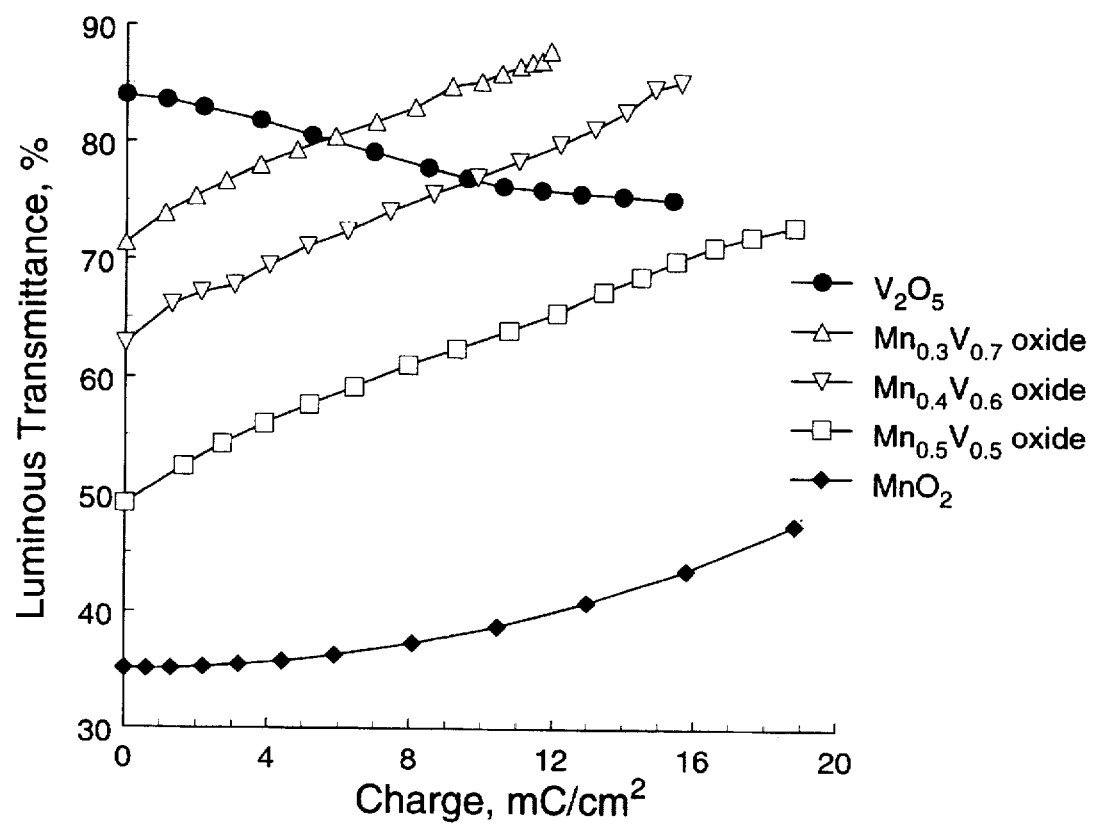
FIG. 8 compares the luminous transmittance of selected $Mn_xV_yO_z$ films of the present invention with prior art films of $V_2O_5$ and $MnO_2$.

A series of Mn$_x$V$_y$O$_z$ films with different Mn/V ratios were deposited on ITO-coated glass by reactive DC magnetron sputtering. The sputtering conditions were identical to those described in Example 2, except for the power applied to each sputter gun. Mn/V ratios were estimated from deposition rates of $MnO_2$ and $V_2O_5$ at similar power levels. Individual $Mn_xV_yO_z$ films were placed in an optically transparent electrochemical cell containing an electrolyte of 1N $LiClO_4$ in propylene carbonate. The electrochemical cell also contained lithium metal reference and counter electrodes. The cell was then placed in a spectrophotometer for measurement of transmittance in the 300 nm to 800 nm wavelength range. The $Mn_xV_yO_z$ films were electrochemically reduced by insertion of lithium and optical transmittance spectra taken as a function of the insertion level. The reduction was accomplished by controlling the electrochemical potential of the $Mn_xV_yO_z$ film with respect to the lithium reference electrode and measuring the charge transfer with a coulometer in the lithium counter electrode circuit. The luminous transmittance, as a function of lithium insertion, was then calculated from the spectral transmittance using the 1931 CIE photopic response (details of the calculation are found in Handbook of Optics, edited by W. G. Driscoll, McGraw-Hill, 1978). In FIG. 8, the luminous transmittance of selected $Mn_xV_yO_z$ films of different Mn/V ratios are compared with films of $V_2O_5$ and $MnO_2$. The luminous transmittance of the $Mn_xV_yO_z$ films increases with lithium insertion, reaching a high level (>70%) of transmittance. The luminous transmittance of the $V_2O_5$ film decreases with lithium insertion while the $MnO_2$ film achieves a maximum transmittance of less than 50%. This example demonstrates the effect of increased transmittance during reduction and decreased transmittance during oxidation for three $Mn_xV_yO_z$ compositions of the present invention. The data of FIG. 8 may be further analyzed to quantify the electro-optical response of the $Mn_xV_yO_z$ and prior art materials. The electro-optical changes in electrochromic films are described by the use of coloration efficiencies which relate optical density change ($\Delta OD$) to the quantity of lithium inserted into the film (q, in coulombs/cm$^2$) through the equation, $$\Delta OD = CEq \quad (1)$$

where CE is the luminous coloration efficiency. The optical density is calculated from the luminous transmittance ($T_l$) through the equation, $$OD = \log_{10}(1/T_l) \quad (2)$$

In equation (1), a negative value of q is defined to represent deinsertion of lithium (i.e. oxidation) from the electrochromic film. With this definition, a negative value of CE represents a film which becomes increasingly transmissive during reduction. Coloration efficiencies calculated from the data in FIG. 8 are listed in Table 1. The coloration efficiencies of the $Mn_xV_yO_z$ films are negative, varying from -5 cm$^2$/C to -9 cm$^2$/C, while the coloration efficiency of $V_2O_5$ is slightly positive (3 cm$^2$/C). The positive coloration efficiency is disadvantageous for an electrochromic material used in electro-optical devices employing reductively coloring materials such as amorphous $WO_3$ as shown by the limited transmittance range of the prior art device in Example 1. The $MnO_2$ film has a negative coloration efficiency (-7 cm$^2$/C) but has inadequate maximum transmittance for practical device applications.

TABLE 1

| Material | CE(cm$^2$/C) |
|---|---|
| $V_2O_5$ | 3 |
| $Mn_{0.3}V_{0.7}$oxide | -5 |
| $Mn_{0.4}V_{0.6}$oxide | -7 |
| $Mn_{0.5}V_{0.5}$oxide | -9 |
| $MnO_2$ | -7 |

EXAMPLE 4

Figure 9:
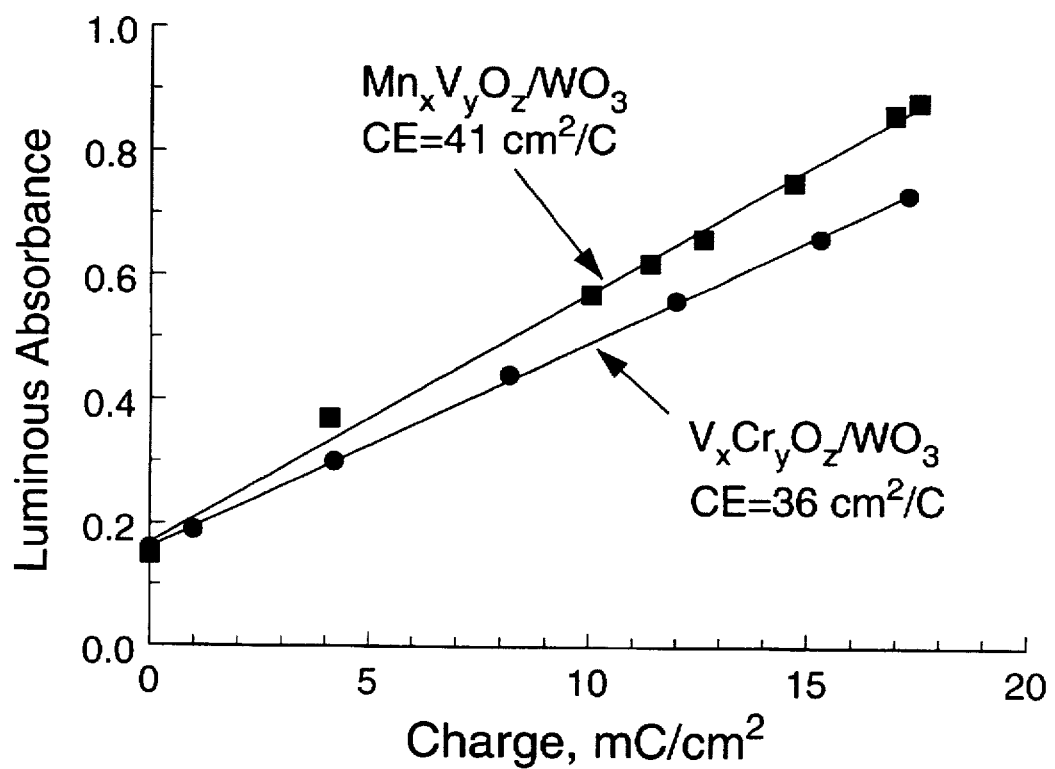
FIG. 9 compares the coloration efficiency of a $Mn_xV_yO_z$ containing electro-optical devices of the present invention with that of a prior art device containing $V_xCr_yO_z$.

In Example 4, the coloration efficiency of an electro-optical device of the present invention employing $Mn_xV_yO_z$ and reductively coloring $WO_3$ is compared with that of a prior art electro-optical device employing $V_xCr_yO_z$ and reductively coloring $WO_3$. The use of oxidatively coloring $V_xCr_yO_z$ as an electrochromic material has been taught by Cogan and Rauh, U.S. Pat. No. 4,938,571 (Reissue No. 34,469, December 1993) and by Cogan et al J. Electrochem. Soc. vol 140, pp 112–115 (1993). Electro-optical devices employing $Mn_xV_yO_z$ and $V_xCr_yO_z$ in the embodiment shown in FIG. 2 were fabricated by the methods described in Examples 1 and 2. The luminous absorbance, which is another term for optical density, of the devices was measured as a function of charge transfer during switching and is compared in FIG. 9. The coloration efficiencies, calculated from the slopes of the lines in FIG. 9, were 41 cm$^2$/C and 36 cm$^2$/C for the $Mn_xV_yO_z$ and $V_xCr_yO_z$ devices, respectively. The higher coloration efficiency of the $Mn_xV_yO_z$ is advantageous in practical devices since less charge transfer is required for the same level of optical modulation.

EXAMPLE 5

Figure 10:
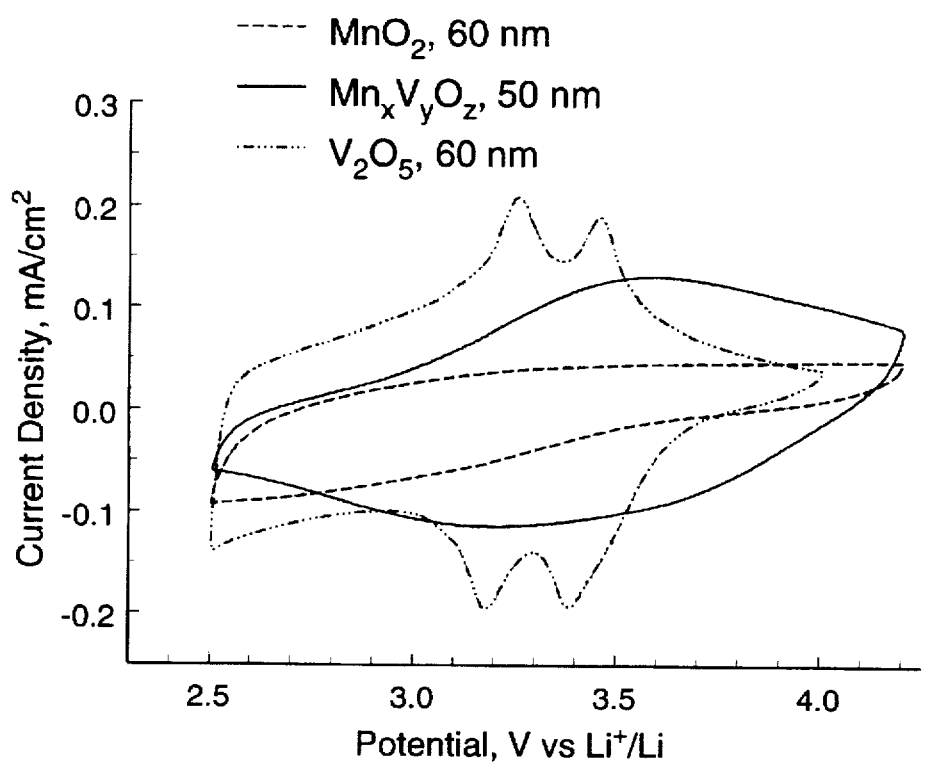
FIG. 10 compares cyclic voltammograms of prior art films of $V_2O_5$ and $MnO_2$ with $Mn_xV_yO_z$ films of the present invention.

In Example 5, cyclic voltammetry in an electrolyte of 1N $LiClO_4$ in propylene carbonate is used to characterize the lithium insertion and extraction reactions in $Mn_xV_yO_z$ and to compare the reversible lithium capacity of $Mn_xV_yO_z$ with prior art electrochromic materials. In FIG. 10, cyclic voltammograms of $Mn_xV_yO_z$ and prior art $V_2O_5$ and $MnO_2$ are compared. The amount of lithium inserted into the electrochromic films during the cyclic voltammetry was measured with a coulometer. The lithium insertion capacity of the $Mn_xV_yO_z$ is 267 mC/cm$^2$ per micron of film thickness while that of $V_2O_5$ and $MnO_2$ are 240 mC/cm$^2$-µm and 106 mC/cm$^2$-µm, respectively. Oxidatively coloring films of $V_xCr_yO_z$ described by Cogan et al (J. Electrochem. Soc. vol 140, pp 112–115 (1993)) have a lithium insertion capacity of 260 mC/cm$^2$-µm. Thus, the $Mn_xV_yO_z$ of the present invention has an equivalent or superior lithium capacity to other oxidatively coloring electrochromic materials employing V or Mn, while exhibiting an advantageously higher coloration efficiency or improved maximum transmittance.

EXAMPLE 6

Figure 11:
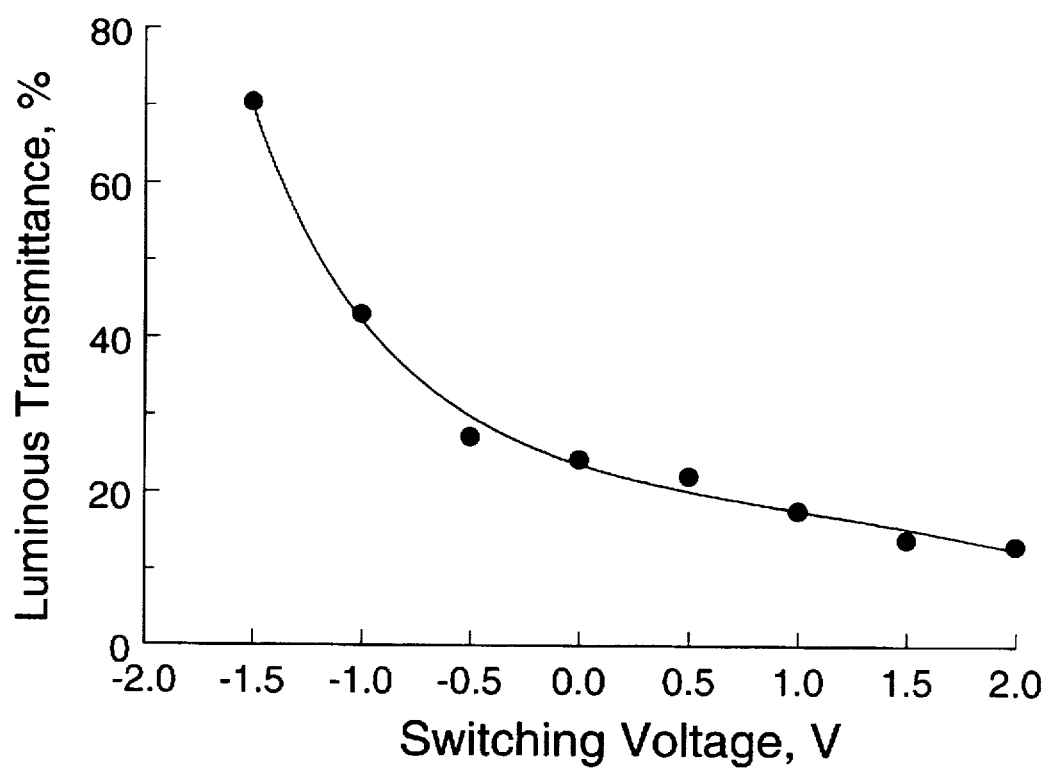
FIG. 11 shows the relationship between switching voltage and luminous transmittance of an electro-optical device of the present invention employing $Mn_xV_yO_z$ and reductively coloring $WO_3$.

Example 6 demonstrates the one-to-one relationship between switching voltage and optical state of an electro-optical device employing $Mn_xV_yO_z$. The aforementioned relationship simplifies the control of the optical state of the device which is advantageous in practical applications. The luminous transmittance of an electro-optical device employing $Mn_xV_yO_z$ and reductively coloring $WO_3$, in a preferred embodiment of the present invention described by FIG. 2, is shown in FIG. 11. The electro-optical device exhibits a one-to-one relationship between voltage and transmittance over the entire -1.5V to 2V switching range.

What is claimed is:

1. An electro-optical device comprising a first substrate, a first electronic contact disposed over said first substrate, a variably transparent layer comprised of $Mn_xV_yO_z$, where $0.05 \leq x/y < 1$, $x+2y < z < 2x+(5/2)y$, and $x+y=1$ coloring on oxidation, a layer comprised of an electrochromic material, said electrochromic material coloring on reduction, an ion conducting layer disposed between said $Mn_xV_yO_z$ layer and said electrochromic material coloring on reduction said $Mn_xV_yO_z$ layer or said reductively coloring electrochromic layer being disposed on said first electronic contact, a second electronic contact disposed over said previous layers, wherein, the optical state of said device is determined by the magnitude and polarity of a voltage applied between said electronic contacts.

2. The electro-optical device of claim 1, wherein a second substrate is disposed over said second electronic contact, one or both of said first and second substrates being substantially transparent.

3. The electro-optical device of claim 2, wherein said ion conducting layer is a polymer.

4. The electro-optical device of claim 3, wherein said polymer is selected from the group polyethylene oxide, mixtures of polyvinylpyrrolidone with polyethylene glycol, and polyvinylpyrrolidone with N-methylpyrrolidone or γ-butyrolactone, all containing dissolved lithium salts.

5. The electro-optical device of claim 3, wherein said polymer conducts $H^+$ ions and is selected from the group of vinyl sulfonic acids.

6. The electro-optical device of claim 1, wherein said reductively coloring electrochromic material is amorphous or crystalline and chosen singly or as a mixture from the group tungsten oxide, molybdenum oxide, and potassium hexatungstate.

7. The electro-optical device of claim 1, wherein said ion conducting layer is selected from the group consisting of lithium based oxides and glassy lithium ion conductors.

8. The electro-optical device of claim 7, wherein said glassy lithium ion conductor comprises a mixture of $Li_2O$ and $B_2O_3$.

9. The electro-optical device of claim 1, wherein said ion conductor is selected from the group of hydrated metal oxides.

10. The electro-optical device of claim 9, wherein said hydrated metal oxides is chosen singly or as a mixture from the group $Ta_2O_5$, $ZrO_2$, and $SiO_2$.

11. The electro-optical device of claim 1, wherein said electronic contacts are substantially transparent and selected from the group tin-doped indium oxide, flourine-doped tin oxide, and aluminum-doped zinc oxide.

12. The electro-optical device of claim 1, wherein one of said electronic contacts is substantially reflective to optical radiation.

13. The electro-optical device of claim 12, wherein said optically reflective electronic contact is selected from the group gold, silver, nickel, aluminum, or chromium.

* * * * *